United States Patent
Douady-Pleven et al.

(10) Patent No.: US 10,743,002 B2
(45) Date of Patent: Aug. 11, 2020

(54) SEQUENTIAL IN-PLACE BLOCKING TRANSPOSITION FOR IMAGE SIGNAL PROCESSING

(71) Applicant: GoPro, Inc., San Mateo, CA (US)

(72) Inventors: Bruno César Douady-Pleven, Bures-sur-Yvette (FR); Vincent Vacquerie, Paris (FR)

(73) Assignee: GoPro, Inc., San Mateo, CA (US)

( * ) Notice: Subject to any disclaimer, the term of this patent is extended or adjusted under 35 U.S.C. 154(b) by 116 days.

(21) Appl. No.: 15/687,918

(22) Filed: Aug. 28, 2017

(65) Prior Publication Data

US 2018/0255307 A1     Sep. 6, 2018

Related U.S. Application Data

(60) Provisional application No. 62/466,560, filed on Mar. 3, 2017.

(51) Int. Cl.

| H04N 19/196 | (2014.01) |
|---|---|
| H04N 19/167 | (2014.01) |
| H04N 19/119 | (2014.01) |
| H04N 19/129 | (2014.01) |
| H04N 19/152 | (2014.01) |
| H04N 19/423 | (2014.01) |
| G06T 3/00 | (2006.01) |

(Continued)

(52) U.S. Cl.
CPC ............. *H04N 19/197* (2014.11); *G06T 1/60* (2013.01); *G06T 3/00* (2013.01); *H04N 19/119* (2014.11); *H04N 19/129* (2014.11); *H04N 19/152* (2014.11); *H04N 19/167* (2014.11); *H04N 19/176* (2014.11); *H04N 19/423* (2014.11); *H04N 19/436* (2014.11); *H04N 19/597* (2014.11)

(58) Field of Classification Search
CPC ............... H04N 19/197; H04N 19/119; H04N 19/19129; H04N 19/152; H04N 19/167; H04N 19/176; H04N 19/436; H04N 19/597; G06T 1/60; G06T 3/00

See application file for complete search history.

(56) References Cited

U.S. PATENT DOCUMENTS 4,918,527 A * 4/1990 Penard .................... G06F 7/785
                                                                                        348/718
5,353,056 A * 10/1994 Westerink .............. H04N 9/093
                                                                                        348/263

(Continued)

*Primary Examiner* — Maria E Vazquez Colon
(74) *Attorney, Agent, or Firm* — Young Basile Hanlon & MacFarlane, P.C.

(57) ABSTRACT

Image signal processing may include obtaining a first portion of a first input image, the first portion having a defined width, a defined height, and a defined portion size, which is a product of multiplying the defined width by the defined height, the first portion of the first input image including a first set of image elements in raster order and having a cardinality of the defined portion size. Image signal processing may include sequential in-place blocking transposition of the first input image, which may include using a buffer, omit using another buffer, and has linear complexity, and may include buffering the first set of image elements using the buffer, the buffer having a defined buffer size within twice the defined portion size, and outputting the first set of image elements from the buffer in block order.

21 Claims, 9 Drawing Sheets

(51) Int. Cl.
*H04N 19/176* (2014.01)
*G06T 1/60* (2006.01)
*H04N 19/597* (2014.01)
*H04N 19/436* (2014.01)

(56) References Cited

U.S. PATENT DOCUMENTS

| | | | | |
|---|---|---|---|---|
| 6,496,192 B1* | 12/2002 | Shreesha | ............... | G06T 1/60 345/531 |
| 8,355,570 B2 | 1/2013 | Karsanbhai | | |
| 9,020,044 B2* | 4/2015 | Zhang | ............... | H04N 19/433 345/530 |
| 2006/0129622 A1* | 6/2006 | Dang | ............... | G06F 17/147 708/406 |
| 2007/0047655 A1* | 3/2007 | Vannerson | ........... | H04N 19/122 375/240.24 |

* cited by examiner

US 10,743,002 B2

SEQUENTIAL IN-PLACE BLOCKING TRANSPOSITION FOR IMAGE SIGNAL PROCESSING

CROSS-REFERENCE TO RELATED APPLICATION(S)

This application claims priority to and the benefit of U.S. Provisional Application Patent Ser. No. 62/466,560, filed Mar. 3, 2017, the entire disclosure of which is hereby incorporated by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to digital image and video processing, including temporal and spatial image noise reduction, local motion compensation, spatially combining images, image distortion compensation, bitrate allocation, image alignment, and prevention of highlight clipping.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure satisfies the foregoing needs by providing, inter alia, apparatus and methods for image signal processing using sequential in-place blocking transposition.

An aspect of the disclosure relates to a non-transitory computer-readable storage medium. In an implementation, the non-transitory computer-readable storage medium comprises instructions that, when executed by a processor, implement performance of operations, including image signal processing using sequential in-place blocking transposition. Image signal processing using sequential in-place blocking transposition may include obtaining at least a first portion of a first input image, the first portion of the first input image having a defined width, a defined height, and a defined portion size, wherein the defined portion size is a product of multiplying the defined width by the defined height, the first portion of the first input image including a first set of image elements in raster order, the first set of image elements having a cardinality of the defined portion size. Sequential in-place blocking transposing the first input image may include using a buffer, omit using another buffer, and has linear complexity. Sequential in-place blocking transposing the first input image may include Sequential in-place blocking transposing the first input image may include buffering the first set of image elements using the buffer, the buffer having a defined buffer size within twice the defined portion size, and outputting the first set of image elements from the buffer in block order.

Another aspect of the disclosure relates to a method. In an implementation, the method comprises an image signal processor executing instructions stored on a non-transitory computer-readable storage medium, and includes obtaining at least a first portion of a first input image, the first portion of the first input image having a defined width, a defined height, and a defined portion size, wherein the defined portion size is a product of multiplying the defined width by the defined height, the first portion of the first input image including a first set of image elements in raster order, the first set of image elements having a cardinality of the defined portion size, and sequential in-place blocking transposing the first input image. Sequential in-place blocking transposing includes using a buffer, omits using another buffer, and has linear complexity. Sequential in-place blocking transposing the first input image includes buffering the first set of image elements using the buffer, the buffer having a defined buffer size, wherein the defined buffer size is one less than the defined portion size, and outputting the first set of image elements from the buffer in block order.

Another aspect of the disclosure relates to an apparatus. In an implementation, the apparatus comprises an image signal processor including a buffer. The buffer having a defined buffer size, the defined buffer size indicating a cardinality of a set of image element buffer locations included in the buffer, wherein each image element buffer location from the set of image element buffer locations is configured to buffer a respective image element. The image signal processor configured to obtain a first portion of the first input image, the first portion of the first input image having a defined width, a defined height, and a defined portion size, wherein the defined portion size is a product of multiplying the defined width by the defined height, the first portion of the first input image including a first set of image elements in raster order, the first set of image elements having a cardinality of the defined portion size. The image signal processor configured to sequential in-place blocking transpose the first input image using the buffer. The image signal processor configured to obtain a second portion of the first input image, the second portion of the first input image having the defined width, the defined height, and the defined portion size, the second portion of the first input image including a second set of image elements in raster order, the second set of image elements having a cardinality of the defined portion size, the first portion of the first input image immediately preceding the second portion of the first input image in raster order. The image signal processor configured to omit performing a multiplication to sequential in-place blocking transpose the first input image using the buffer, omit performing a division to sequential in-place blocking transpose the first input image using the buffer, omit performing a modulo to sequential in-place blocking transpose the first input image using the buffer, and buffer the first set of image elements using the buffer, wherein the defined buffer size is one less than the defined portion size. The image signal processor configured to, substantially concurrently, buffer the second set of image elements in raster order using the buffer, and output the first set of image elements from the buffer in block order.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly dictates otherwise.

BRIEF DESCRIPTION OF THE DRAWINGS

The disclosed embodiments have other advantages and features which will be more readily apparent from the detailed description, the appended claims, and the accompanying figures. A brief introduction of the figures is below.

All figures disclosed herein are © Copyright 2017 GoPro Inc. All rights reserved.

DETAILED DESCRIPTION

Implementations of the present technology will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image signal processor (ISP) may receive the image signal from one or more sensors and may process the image signal to generate an image, picture, or frame.

Processing the image signal may include using sequential in-place blocking transposition. Image signal processing using sequential in-place blocking transposition may include buffering an input image, or a portion thereof, in raster order using a buffer that has a size that is one less than a size of the image, or the image portion, buffered. Substantially concurrently with buffering the input image, or the portion thereof, sequential in-place blocking transposition may include outputting previously buffered image data from the buffer in block order.

Figure 1:
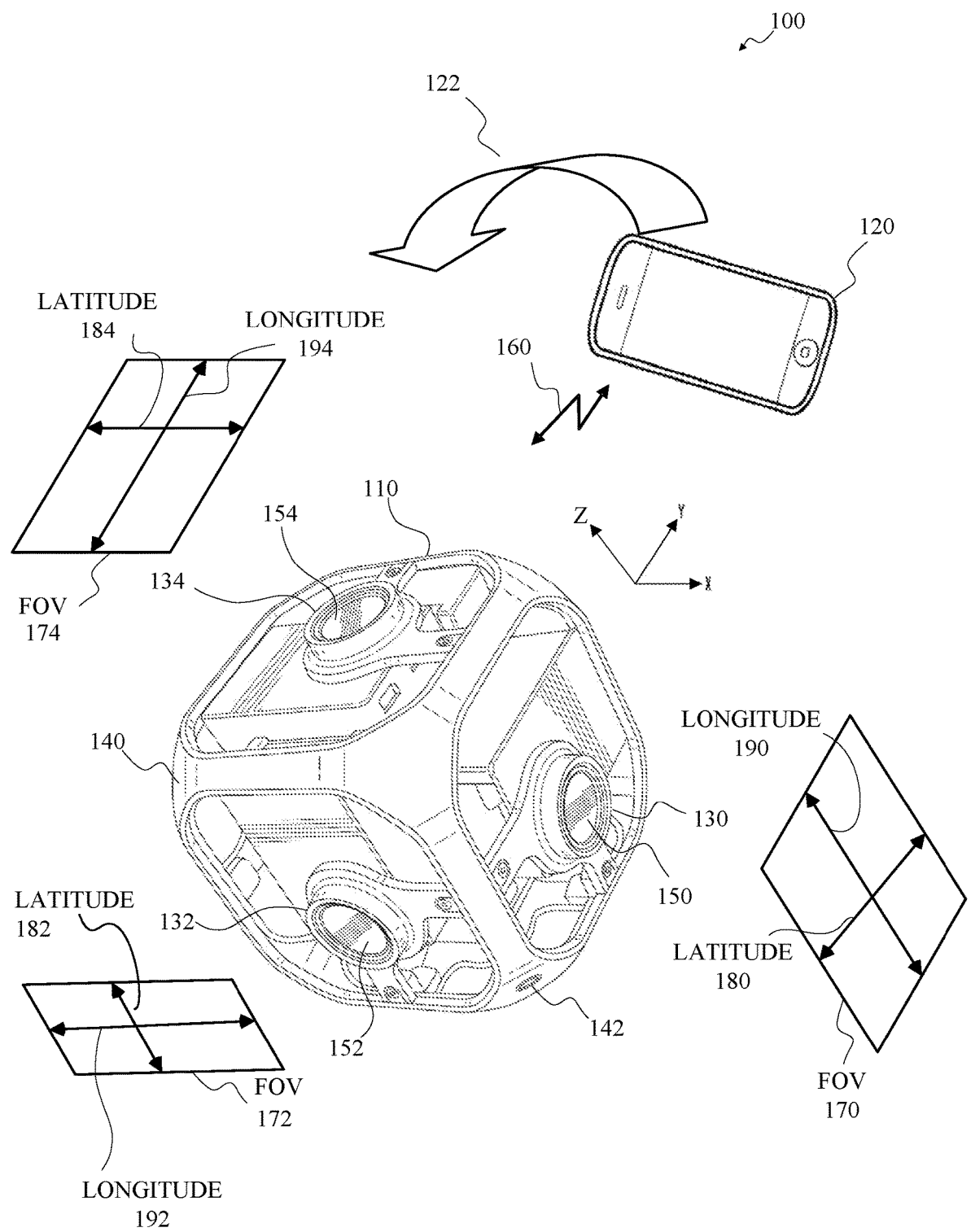
FIG. 1 is a diagram of an example of an image capture system for content capture in accordance with implementations of this disclosure.

FIG. 1 is a diagram of an example of an image capture system 100 for content capture in accordance with implementations of this disclosure. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a lateral dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the lateral dimension 184 of the field-of-view 174 for the image capture device 134, the lateral dimension 180 of the field-of-view 170 for the image capture device 130 may be oriented at 90° with respect to the longitudinal dimension 192 of the field-of-view 172 for the image capture device 132, and the lateral dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, In some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate, or sweep, the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application, such as the GoPro App, may generate and share, such as via a cloud-based or social media service, one or more images, or short video clips, such as in response to user input.

In some implementations, the user interface device 120, such as via an application, such as the GoPro App, may remotely control the image capture apparatus 110, such as in response to user input.

In some implementations, the user interface device 120, such as via an application, such as the GoPro App, may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application, such as the GoPro App, may mark one or more key moments contemporaneously with capturing the images or video by the image capture apparatus 110, such as with a HiLight Tag, such as in response to user input.

In some implementations, the user interface device 120, such as via an application, such as the GoPro App, may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application, such as the GoPro App, may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting, such as 3840 pixels by 2160 pixels, a frame rate setting, such as 60 frames per second (fps), a location setting, and/or a context setting, which may indicate an activity, such as mountain biking, in response to user input, and may communicate the settings, or related information, to the image capture apparatus 110.

Figure 2:
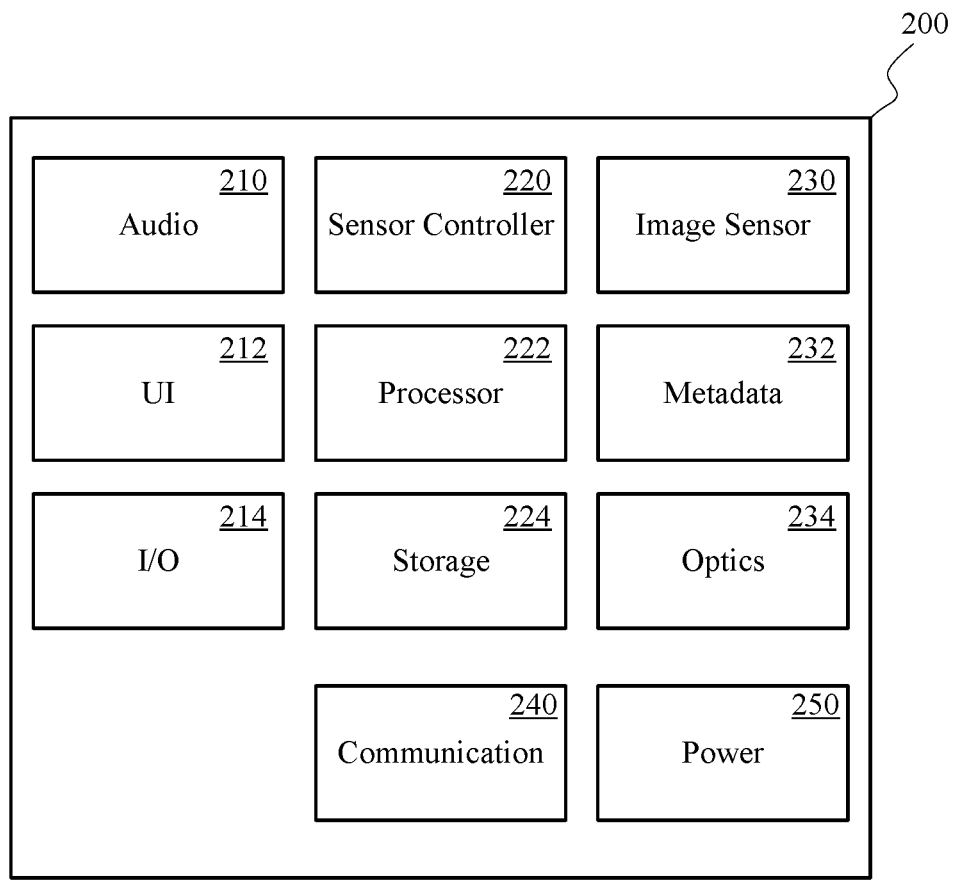
FIG. 2 is a block diagram of an example of an image capture device in accordance with implementations of this disclosure.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, e.g., Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or other audio coding formats (audio codecs). In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements, such as buttons and/or virtual touch screen buttons, lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information, which may include image resolution information, frame rate information, capture mode information, sensor mode information, video mode information, photo mode information, or a combination thereof, connection status information, such as connected, wireless, wired, or a combination thereof, power mode information, such as standby mode information, sensor mode information, video mode information, or a combination thereof, information related to other information sources, such as heart rate information, global positioning system information, or a combination thereof, and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press (pulse width modulation), a number of button presses (pulse code modulation), or a combination thereof. In an example, a sensor acquisition mode may be initiated in response to detecting two short button presses. In another example, the initiation of a video mode and cessation of a photo mode, or the initiation of a photo mode and cessation of a video mode, may be triggered (toggled) in response to a single short button press. In another example, video or photo capture for a given time duration or a number of frames (burst capture) may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface, such as a Wi-Fi interface, a Bluetooth interface, a USB interface, an HDMI interface, a Wireless USB interface, a Near Field Communication (NFC) interface, an Ethernet interface, a radio frequency transceiver interface, and/or other interfaces, for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, e.g., a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, CPU, DSP, application-specific integrated circuit (ASIC), GPU, and/or other processor that may control the operation and functionality of the image capture device 200. In some implementations, the processor 222 may interface with the sensor controller 220 to obtain and process sensory information for, e.g., object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content, such as images or videos, captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method, such as H.264, H.265, CineForm and/or other codecs.

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 222 in accordance with a defined schedule, such as values of latitude, longitude, and elevation at 10 Hz.

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content (e.g., metadata, images, audio) captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image, image resolution, frame rate, burst setting, white balance, recording configuration, such as loop mode, audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an inertial measurement unit, which may include one or more accelerometers and/or gyroscopes, a magnetometer, a compass, a global positioning system sensor, an altimeter, an ambient light sensor, a temperature sensor, and/or other sensors or combinations of sensors. In some implementations, the image capture device 200 may contain one or more other metadata/telemetry sources, e.g., image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a global positioning system sensor that may provide global positioning system coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a global positioning system unit as a second physical unit. In some implementations, the metadata unit 232, or one or more portions thereof, may be included in an image capture device 200 as shown, or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component, such as a dongle, having an infrared sensor, a radio frequency transceiver and antenna, an ultrasonic transducer, and/or other communications interfaces used to send and receive wireless communication signals. In some implementations, the communication unit 240 may include a local, such as Bluetooth or Wi-Fi, and/or broad range, such as cellular LTE, communications interface for communication between the image capture device 200 and a remote device, such as the user interface device 120 in FIG. 1. The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution, such as battery, solar cell, inductive (contactless) power source, rectification, and/or other power supply, may be used.

Consistent with the present disclosure, the components of the image capture device 200 may be remote from one another and/or aggregated. For example, one or more sensor components may be distal from the image capture device 200, e.g., such as shown and described with respect to FIG. 1. Multiple mechanical, sensory, or electrical units may be controlled by a learning apparatus via network/radio connectivity.

Figure 3:
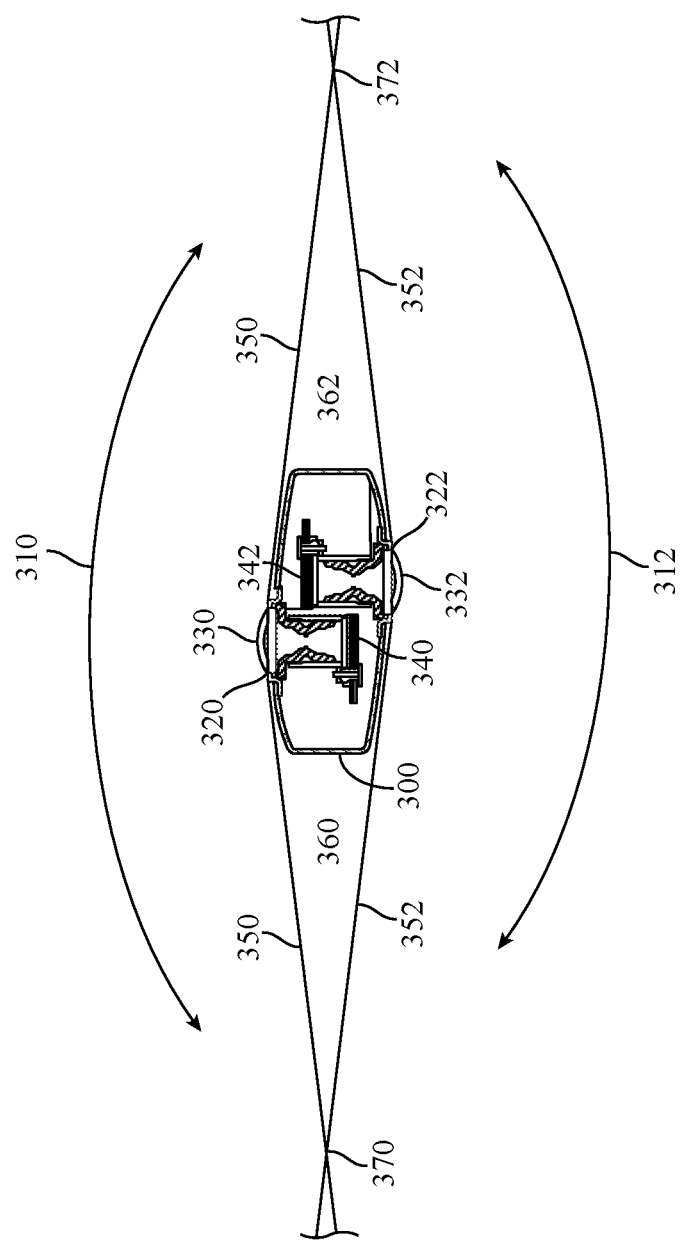
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 may include image capture devices 320, 322, related components, or a combination thereof, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the corresponding image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment, such as position and/or tilt, of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses, such as lenses aligned along the same axis, the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 4:
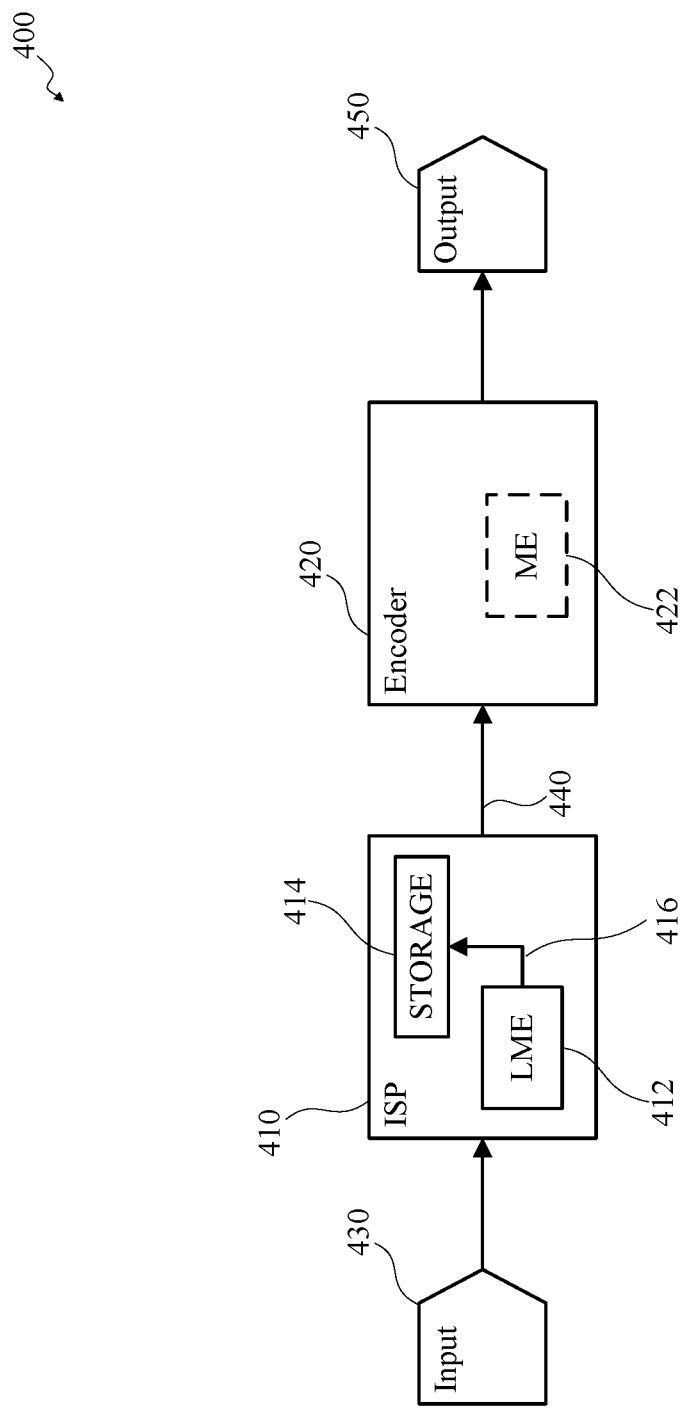
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

In some implementations, the image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as 24, 30, or 60 frames per second.

In some implementations, the image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks, such as having 4×4, 16×16, 64×64, and/or other dimensions. In some implementations, the local motion estimation unit 412 may partition the input image signal 430 into arbitrarily shaped patches and/or individual pixels.

In some implementations, the local motion estimation unit 412 may compare pixel values of blocks of pixels between image frames, such as successive image frames, from the input image signal 430 to determine displacement, or movement, between frames. The local motion estimation unit 412 may produce motion vectors, such as an x component and y component of motion, at multiple locations within an image frame. The motion vectors may be represented by a translational model or other models that may approximate camera motion, such as rotation and translation in three dimensions, and zooming.

In some implementations, the image signal processor 410 of the image processing and coding pipeline 400 may include electronic storage 414, such as memory, such as random access memory (RAM), flash, or other types of memory. The electronic storage 414 may store local motion estimation information 416 determined by the local motion estimation unit 412 for one or more frames. The local motion estimation information 416 and associated image or images may be output 440 to the encoder 420. In some implementations, the electronic storage 414 may include a buffer, or cache, and may buffer the input image signal as an input, or source, image, or frame.

In some implementations, the image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

In some implementations, the encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

In some implementations, the encoder 420 may include a motion estimation unit 422 that may determine motion information for encoding the image output 440 of the image signal processor 410. In some implementations, the encoder 420 may encode the image output 440 of the image signal processor 410 using motion information generated by the motion estimation unit 422 of the encoder 420, the local motion estimation information 416 generated by the local motion estimation unit 412 of the image signal processor 410, or a combination thereof.

For example, the motion estimation unit 422 may determine motion information at pixel block sizes that may differ from pixel block sizes used by the local motion estimation unit 412. In another example, the motion estimation unit 422 of the encoder 420 may generate motion information and the encoder may encode the image output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

In some implementations, the image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

In some implementations, the image signal processor 410 may store motion information, such as the local motion estimation information 416, in a memory, such as the electronic storage 414, and the encoder 420 may read the motion information from the electronic storage 414 or otherwise receive the motion information from the image signal processor 410. The encoder 420 may use the motion estimation information determined by the image signal processor 410 for motion compensation processing.

Figure 5:
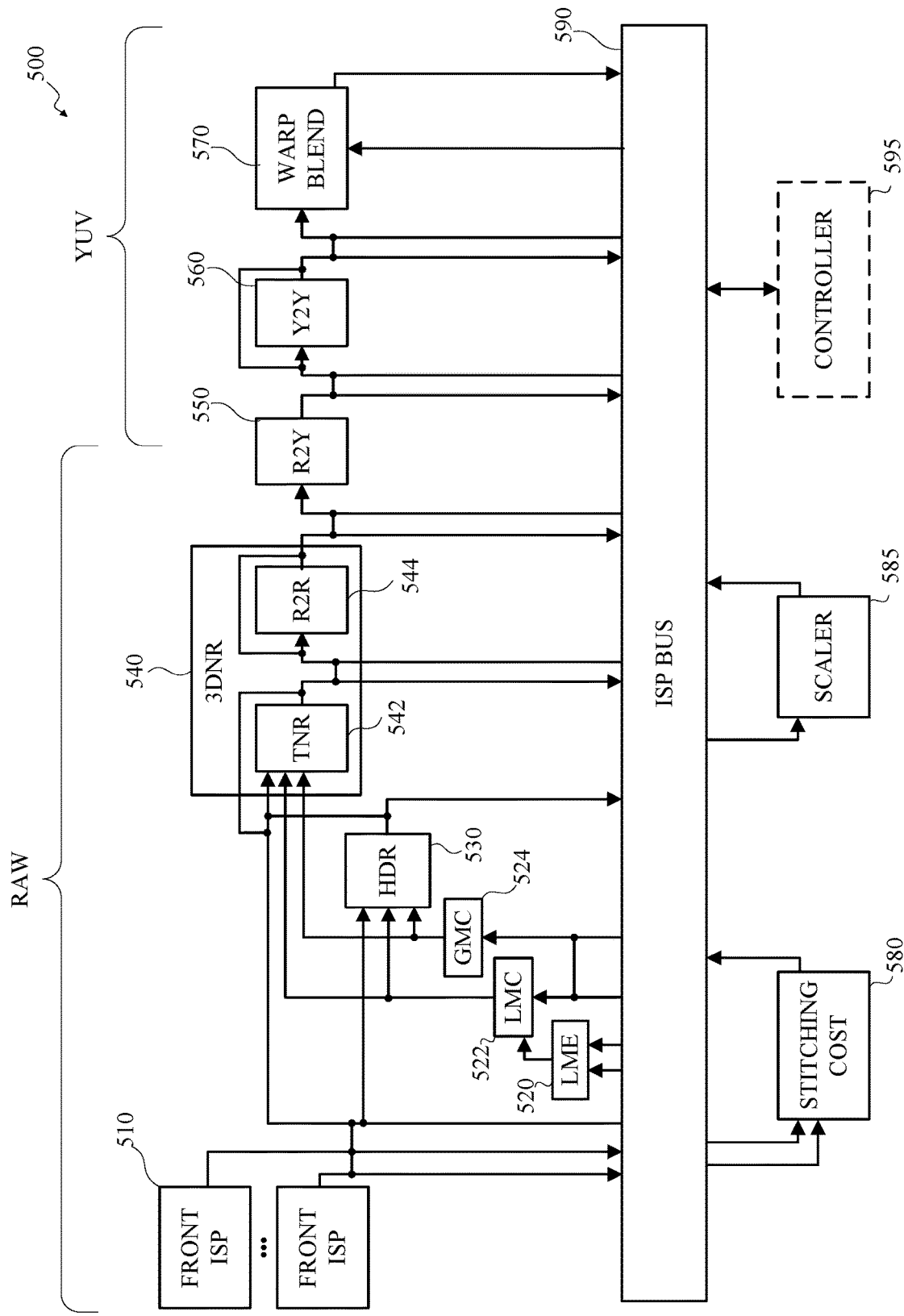
FIG. 5 is a functional block diagram of an example of an image signal processor in accordance with implementations of this disclosure.

FIG. 5 is a functional block diagram of an example of an image signal processor 500 in accordance with implementations of this disclosure. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local motion estimation (LME) unit 520, a local motion compensation (LMC) unit 522, a global motion compensation (GMC) unit 524, a high dynamic range (HDR) unit 530, a three-dimensional noise reduction (3DNR) unit 540, which may include a temporal noise reduction (TNR) unit 542 and a raw to raw (R2R) unit 544, a raw to YUV (R2Y) unit 550, a YUV to YUV (Y2Y) unit 560, a warp and blend unit 570, a stitching cost unit 580, a scaler 585, an image signal processing bus (ISP BUS) 590, a configuration controller 595, or a combination thereof.

Although not shown expressly in FIG. 5, in some implementations, one or more of the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, the configuration controller 595, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high resolution frame, one or more downscaled, or reduced, resolution frames, such as a ½×½ resolution frame, a ¼×¼ resolution frame, a ⅛×⅛ resolution frame, a 1/16×1/16 resolution frame, a 1/32×1/32 resolution frame, or any combination thereof.

In some implementations, a multiple camera apparatus, such as the image capture apparatus 110 shown in FIG. 1, may include multiple image capture devices, such as the image capture device 200 shown in FIG. 2, and may include a respective front image signal processor 510 associated with each image capture device.

The local motion estimation unit 520 may receive, or otherwise access, an input frame, or one or more portions thereof, which may be a current input frame, such as via the image signal processor bus 590. In some implementations, the local motion estimation unit 520 may receive the current input frame at a downscaled, or reduced, resolution. In some implementations, such as implementations implementing high dynamic range image processing, the current input frame may be a long exposure input frame.

The local motion estimation unit 520 may receive, or otherwise access, a reference frame, or one or more portions thereof, such as via the image signal processor bus 590. The reference frame may be a previously generated motion compensated prior frame, which may be associated with a temporal location preceding a temporal location associated with the current input frame. For example, the reference frame may be a recirculated frame from the temporal noise reduction unit 542. In some implementations, such as implementations including high dynamic range image processing, the reference frame may be a short exposure input frame corresponding to the long exposure current input frame.

In some implementations, the local motion estimation unit 520 may receive, or otherwise access, previously generated motion information, such as previously generated motion vectors for the current input frame or motion information for a previously processed frame.

The local motion estimation unit 520 may determine motion information, such as motion vectors, representing motion between the current input frame and the reference frame, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, the reference frame, or one or more portions thereof, such as via the image signal processor bus 590. In some implementations, such as implementations implementing high dynamic range image processing, the reference frame may be the short exposure input frame.

The local motion compensation unit 522 may receive, or otherwise access, motion information, such as motion vectors, associated with the current input frame. For example, the local motion compensation unit 522 may receive the motion vectors from the local motion estimation unit 520.

The local motion compensation unit 522 may apply the motion vectors to the reference frame, or one or more portions thereof, which may align, or partially align, the reference frame, or one or more portions thereof, with the current input frame, or one or more portions thereof.

The local motion compensation unit 522 may output a local motion compensated reference frame, or one or more portions thereof.

The global motion compensation unit 524 may receive, or otherwise access, the reference frame, or one or more portions thereof, such as via the image signal processor bus 590. In some implementations, such as implementations implementing high dynamic range image processing, the reference frame may be the short exposure input frame.

The global motion compensation unit 524 may receive, or otherwise access, global motion information, such as global motion information from a gyroscopic unit of the image capture apparatus, such as a gyroscopic sensor included in the metadata unit 232 shown in FIG. 2, corresponding to the current input frame. The global motion information may indicate a rotational change in the orientation of the field-of-view relative to the content captured in respective images. For example, the global motion information may indicate a horizontal change of the field-of-view, which may indicate that the corresponding camera panned, or rotated, around a vertical axis. In another example, the global motion information may indicate a vertical change of the field-of-view, which may indicate that the camera tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus.

The global motion compensation unit 524 may apply the global motion information to the reference frame, or one or more portions thereof, which may align, or partially align, the reference frame, or one or more portions thereof, with the current input frame, or one or more portions thereof.

The global motion compensation unit 524 may output a global motion compensated reference frame, or one or more portions thereof.

The high dynamic range (HDR) unit 530 may receive, or otherwise access, the current input frame, or one or more portions thereof, such as from the front image signal processor 510. The current input frame may be a long exposure input frame corresponding to the short exposure reference frame. The high dynamic range unit 530 may receive, or otherwise access, the local motion compensated reference frame from the local motion compensation unit 522. The high dynamic range unit 530 may receive, or otherwise access, the global motion compensated reference frame from the global motion compensation unit 524.

The high dynamic range (HDR) unit 530 may generate a high dynamic range image based on the current input image and the local motion compensated reference frame, the global motion compensated reference frame, or a combination thereof.

The high dynamic range (HDR) unit 530 may output the high dynamic range image. For example, the high dynamic range (HDR) unit 530 may output the high dynamic range image by storing the high dynamic range image in memory, such as shared memory, via the image signal processor bus 590, or the high dynamic range (HDR) unit 530 may output the high dynamic range image directly to another unit of the image signal processor 500, such as the temporal noise reduction unit 542.

In some implementations, the high dynamic range (HDR) unit 530 may be omitted, or high dynamic range processing by the high dynamic range (HDR) unit 530 may be omitted.

The three-dimensional noise reduction unit 540 may include the temporal noise reduction (TNR) unit 542, the raw to raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, the local motion compensated reference frame from the local motion compensation unit 522. The temporal noise reduction unit 542 may receive, or otherwise access, the global motion compensated reference frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local motion compensation unit 522, the global motion compensated frame output by the global motion compensation unit 524, or a combination thereof.

The temporal noise reduction unit 542 may generate output including a pixel value and associated noise variance for the pixel value for one or more pixels of the current input frame.

The raw to raw unit 544 may perform spatial denoising of frames of raw images based on noise variance values received from the temporal noise reduction unit 542. For example, spatial denoising in the raw to raw unit 544 may include multiple passes of image signal processing, including passes at various resolutions.

The raw to YUV unit 550 may demosaic, and/or color process, the frames of raw images, which may include representing each pixel in the YUV format, which may include a combination of a luminance (Y) component and two chrominance (UV) components.

The YUV to YUV unit 560 may perform local tone mapping of YUV images. In some implementations, the YUV to YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of each frame to a rectangle. For example, the warp and blend unit 570 may warp a corona around the equator of each frame to a rectangle based on the corresponding low resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear (fisheye) images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity x and longitude y based on a warping. Each value of the cost map may be a cost function of a disparity x value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processing bus 590 may be a bus or interconnect, such as an on-chip interconnect or embedded microcontroller bus interface, for communication between the front image signal processor 510, the temporal noise reduction unit 542, the local motion compensation unit 522, the raw to raw unit 544, the raw to YUV unit 550, the YUV to YUV unit 560, the combined warp and blend unit 570, the stitching cost unit 580, the scaler 585, the configuration controller 595, or any combination thereof.

The configuration controller 595 may coordinate image processing by the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
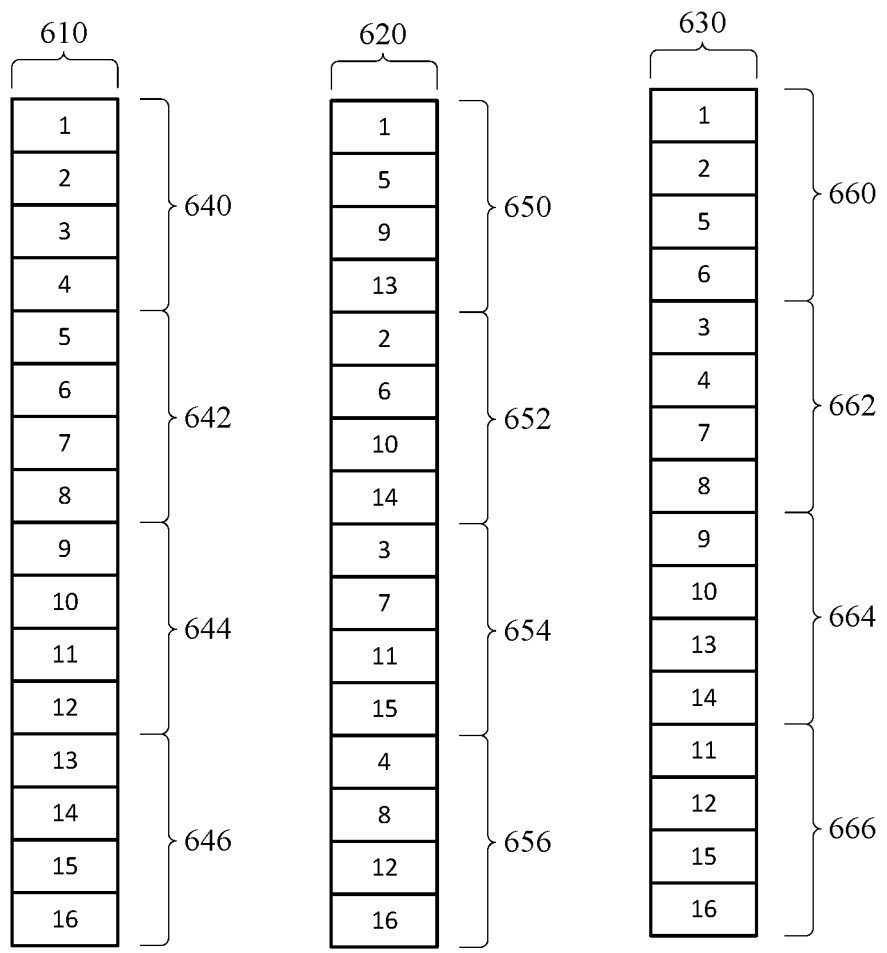
FIG. 6 is a diagram of an example of input image data represented as a two-dimensional matrix, a one-dimensional array buffer in raster order, a one-dimensional array buffer in column order, and a one-dimensional array buffer in block order in accordance with implementations of this disclosure.

FIG. 6 is a diagram of an example of input image data represented as a two-dimensional matrix 600, a one-dimensional array buffer 610 in raster order, a one-dimensional array buffer 620 in column order, and a one-dimensional array buffer 630 in block order in accordance with implementations of this disclosure.

An input image, such as an input image received by an image signal processor, such as the image signal processor 500 shown in FIG. 5, as one or more input image signals, such as the input image signal 430 shown in FIG. 4, from one or more image sensors, such as the image sensor 230 shown in FIG. 2 or the image sensors 340, 342 shown in FIG. 3, or from one or more front image signal processors, such as the front image signal processors 510 shown in FIG. 5, may represent input image information as a two-dimensional matrix 600, in which each location in the two-dimensional matrix 600 corresponds spatially with a respective portion of the captured input image and includes a respective value, or values, for a corresponding pixel. For simplicity, in FIG. 6, a 4×4 input image is shown, including four rows 640, 642, 644, 646 and four columns 650, 652, 654, 656 as represented by the two-dimensional matrix 600; however, any size image, or frame, may be used. For example, an input image, or frame, may be a 3840×2160 image, which may include 3840 pixels per row and 2160 rows.

The two-dimensional input image data may be received, obtained, or buffered as serialized data, such as data in raster order, row order, or row-major order, such that the respective pixel values are ordered sequentially from the top-left to the bottom-right, and buffered, or internally stored (in-place or in-situ), using a one-dimensional physical, or virtual, internal data storage unit, such as the one-dimensional array buffer 610, 620, 630. The one-dimensional array buffer 610, 620, 630 may correspond with physical, or virtual, memory allocation for buffering, or internally storing, the input image.

In the two-dimensional matrix 600, the pixels are labeled in raster order representative of the respective spatial location of the pixels in the input image, which may correspond with the order in which the image data is received, obtained, or buffered. The top row 640 includes the pixels 1, 2, 3, and 4; the second from the top row 642 includes the pixels 5, 6, 7, and 8; the third from the top row 644 includes the pixels 9, 10, 11, and 12; and the bottom row 646 includes the pixels 13, 14, 15, and 16. The left column 650 includes the pixels 1, 5, 9, and 13; the second from the left column 652 includes the pixels 2, 6, 10, and 14; the third from the left column 654 includes the pixels 3, 7, 11, and 15; and the right column 656 includes the pixels 4, 8, 12, and 16.

The image or frame may be divided into sub-units or blocks, which may be rectangular spatially non-overlapping portions of the image. The 4×4 input image represented by the two-dimensional matrix 600 is divided into four non-overlapping 2×2 blocks 660, 662, 664, 666. The top-left 2×2 block 660 includes the pixels 1, 2, 5, 6 in the left two columns 650, 652 of the top two rows 640, 642; the top-right 2×2 block 662 includes the pixels 3, 4, 7, 8 in the right two columns 654, 656 of the top two rows 640, 642; the bottom-left 2×2 block 664 includes the pixels 9, 10, 13, 14 in the left two columns 650, 652 of the bottom two rows 644, 646; and the bottom-right 2×2 block 666 includes the pixels 11, 12, 15, 16 in the right two columns 654, 656 of the bottom two rows 644, 646.

Raster order describes reading, writing, or otherwise processing data, such as input image data, which may be represented as a two-dimensional matrix, such as the two-dimensional matrix 600, such that elements of the data, such as pixels, are ordered sequentially, or serially, pixel-by-pixel from left to right across rows, and the rows ordered from the top to the bottom of the frame. In an example, a value, or values, for the pixel labeled 5 may be ordered immediately subsequent to a value, or values, for the pixel labeled 4. The input image data, such as the pixel values, may be serialized in raster order into a one-dimensional representation, such as the one-dimensional array buffer 610. For example, input image data may be received and buffered in raster order.

Column order describes reading, writing, or otherwise processing data, such as input image data, which may be represented as a two-dimensional matrix, such as the two-dimensional matrix 600, such that elements of the data, such as pixels, are ordered sequentially, or serially, pixel-by-pixel from top to bottom along columns, and the columns ordered from the left to the right of the frame. In an example, a value, or values, for the pixel labeled 2 may be ordered immediately subsequent to a value, or values, for the pixel labeled 13. The input image data, such as the pixel values, may be serialized in column order into a one-dimensional representation, such as the one-dimensional array 620. For example, input image data buffered in raster order may be transposed, or reordered, into column order.

Block order describes reading, writing, or otherwise processing data, such as input image data, which may be represented as a two-dimensional matrix, such as the two-dimensional matrix 600, such that elements of the data, such as pixels, are ordered sequentially, or serially, in raster order within respective blocks, the blocks ordered in raster order within the image. In an example, a value, or values, for the pixel labeled 3 may be ordered immediately subsequent to a value, or values, for the pixel labeled 6. The input image data, such as the pixel values, may be serialized in block order into a one-dimensional representation, such as the one-dimensional array 630.

For simplicity and clarity, pixels, or pixel locations, may be referenced or indicated using raster order enumeration as shown in FIG. 6 or using coordinates, such as Cartesian coordinates, based on row and column position within the input image as represented by the two-dimensional matrix 600, which may be expressed using zero based numbering. For example, the top row 640 may be referred to as row zero (0), the left column may be referred to as column zero (0), and the pixel in the top-left corner, pixel 1 as shown, may be referred to using the coordinates 0,0. In another example, the bottom row 646 may be referred to as row three (3), the right column may be referred to as column three (3), and the pixel in the bottom-right corner, pixel 16 as shown, may be referred to using the coordinates 3,3.

Information, such as pixel values from an image or frame, stored in a buffer implemented as a one-dimensional array buffer 610, 620, 630 may be accessed sequentially. Information expressly correlating the spatial location of a pixel in the input image with the memory location of the corresponding information may be unavailable.

Although three one-dimensional array buffers 610, 620, 630 are shown in FIG. 6, the memory available for caching, buffering, or internally storing, input image data by an image signal processor, such as the image signal processor 500 shown in FIG. 5, may be limited. For example, a 3840×2160 input image, which may include 3840 pixels per row and 2160 rows, may include 8294400 pixel values, and buffering, or internally storing the input image may include using a data storage unit, such as a buffer or internal memory that may be limited to storing 8294400 pixel values. Other memory units of a similar magnitude may be unavailable. For example, an image signal processor, such as the image signal processor 500 shown in FIG. 5, may include an image size buffer for buffering an input image and may omit, or omit using, other similarly sized memory units. The image signal processor may include a limited number of other internal memory elements for storing or maintaining other information related to processing an input image, such as pointers, counters, or individual pixel values.

The relative efficiency of respective image processing operations may correspond, at least in part, with the order in which the image data is stored or otherwise accessible. For example, the efficiency of a first image processing operation implemented using image data ordered in raster order may exceed the efficiency of the first image processing operation implemented using image data ordered in column order or block order; the efficiency of a second image processing operation implemented using image data ordered in column order may exceed the efficiency of the second image processing operation implemented using image data ordered in raster order or block order; and the efficiency of a third image processing operation implemented using image data ordered in block order may exceed the efficiency of the third image processing operation implemented using image data ordered in raster order or column order.

Image signal processing using double buffer data transposition may improve the efficiency of some image signal processing operations by outputting image data for a first input image from a first buffer in column order, as represented by the one-dimensional array buffer 620 in column order, and concurrently, or substantially concurrently, receiving and buffering input image data for a second input image in raster order using a second buffer, as represented by the one-dimensional array buffer 610 in raster order. In some embodiments, the first buffer and the second buffer may be implemented as a one buffer twice the size of the input data.

Image signal processing using address mapping in-place transposition may include transposition between raster order and column order or between raster order and block order with limited internal memory utilization, which may include identifying a memory location for inputting, buffering, or writing to internal memory an input pixel value, or for outputting or reading an output pixel value by calculating a value of a modulo operation, or a remainder of a division operation, which may have a quasilinear or linearithmic (n*log(n)) operational or time complexity.

Image signal processing using sequential in-place transposition may include transposition between raster order and column order or between raster order and block order with an internal memory utilization that may be significantly lower, such as half, the internal memory utilization of image signal processing using double buffer data transposition and may have a linear operational or time complexity, which may be significantly lower than the quasilinear or linearithmic (n*log(n)) complexity of address mapping in-place transposition.

Figure 7:
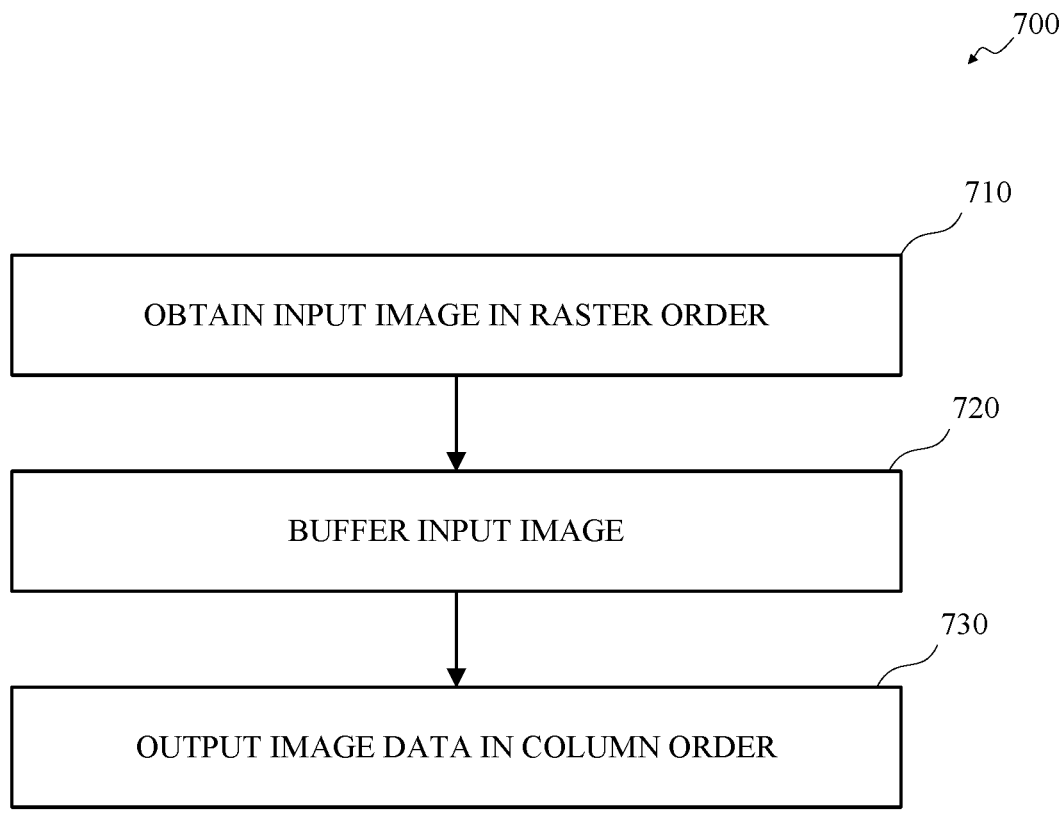
FIG. 7 is a diagram of an example of image signal processing using sequential in-place transposition in accordance with implementations of this disclosure.

FIG. 7 is a diagram of an example of image signal processing using sequential in-place transposition in accordance with implementations of this disclosure. Image signal processing using sequential in-place transposition 700 may be implemented in an image capture apparatus, such as the image capture apparatus 110 shown in FIG. 1 or the image capture apparatus 300 shown in FIG. 3. For example, the image signal processor 500 shown in FIG. 5 may implement image signal processing using sequential in-place transposition 700.

In some implementations, image signal processing using sequential in-place transposition 700 may include obtaining input image data in raster order at 710, buffering the input image data using a buffer at 720, and outputting the input image data from the buffer in column order at 730. Although shown separately in FIG. 7, obtaining input image data in raster order at 710, buffering the input image data at 720, and outputting the input image data in column order at 730 may be performed substantially concurrently for multiple images.

Input image data may be obtained in raster order at 710. An image signal processor, such as the image signal processor 410 shown in FIG. 4 or the image signal processor 500 shown in FIG. 5, which may be included in an image capture apparatus, may receive one or more input image signals, such as the input image signal 430 shown in FIG. 4, from one or more image sensors, such as the image sensor 230 shown in FIG. 2 or the image sensors 340, 342 shown in FIG. 3, or from one or more front image signal processors, such as the front image signal processors 510 shown in FIG. 5, which may include the input image data, such as pixel values, in raster order, for an input image. Obtaining the input image data for an input image, or frame, at 710 may include receiving, or otherwise accessing, a raster order sequence of pixel values.

An input image may be represented as a two-dimensional matrix, such as the two-dimensional matrix 600 shown in FIG. 6, wherein each location in the two-dimensional matrix corresponds spatially with a respective portion of the captured input image and includes a respective value, or values, for a corresponding pixel. The input image may include W columns and H rows, which may be referred to as a W×H image. The set of pixels of a W×H input image may have a cardinality of WH. For example, an input image, or frame, may be a 3840×2160 image, which may include 3840 columns (W=3840), or pixels per row, and 2160 rows (H=2160), and may include 8294400 pixels (WH=8294400).

Although not shown separately in FIG. 7, in some implementations, image signal processing using sequential in-place transposition 700 may include determining whether to perform image signal processing using sequential in-place transposition 700. For example, image signal processing using sequential in-place transposition 700 may include identifying a subsequent image signal processing operation, wherein outputting the image data in column order at 730 may include outputting the image data to, or for use by, the subsequent image signal processing operation, and may include determining whether to perform image signal processing using sequential in-place transposition 700 based on the relative efficiency of performing the subsequent image signal processing operation using raster order data or column order data, such that the efficiency of image signal processing is maximized.

The input image data may be buffered at 720. Buffering the input image data may include buffering, writing, caching, or internally storing the input image data, such as the pixel values, in an internal data storage unit, such as a memory or buffer, which may be implemented as a one-dimensional array, by sequentially buffering each element, such as each pixel, of the input image data in raster order.

The memory available for caching, buffering, or internally storing input image data may be limited or minimized. For example, the W×H input image may include WH pixels and buffering, or internally storing, the input image may include using a data storage unit, such as a buffer or internal memory limited to storing fewer than 2WH pixels. For example, the internal buffer may include WH−1 memory locations for concurrently buffering WH−1 pixels. Other memory units of a similar magnitude, or larger memory units, may be unavailable. In an example, the input image may be a 3840×2160 image and buffering the input image data may include using a buffer having 8294399 memory locations (3840*2160−1=8294399).

For example, an image signal processor, such as the image signal processor 500 shown in FIG. 5, may include an image size (WH−1) buffer for buffering an input image and may omit, or omit using, other similarly sized memory units. Image signal processing using sequential in-place transposition may include using a limited, or minimal, number of other internal memory elements, such as ten or twenty discrete memory locations, such as eight bit memory locations, for storing or maintaining other information related to image signal processing using sequential in-place transposition, such as pointers, counters, or individual pixel values. The combined cardinality of memory locations used for sequential in-place transposition, including discrete memory locations and buffer memory locations, may be significantly less than 2WH, such as within WH+W.

Buffering the input image data at 720 may include buffering a top-left pixel of the input image in a first memory location and, subsequently, sequentially buffering each respective pixel from the image in raster order in a respective memory location. The leftmost pixel in a current row may be buffered immediately subsequent to buffering the rightmost pixel from the row immediately adjacent above the current row. Buffering a pixel may include obtaining, such as by determining, calculating, or identifying, a memory location for buffering the respective pixel, such as a physical or virtual address of the memory location. For example, the buffer may be implemented as a one-dimensional array and obtaining the memory location for buffering a pixel may include obtaining an index or position in the one-dimensional array.

The input image data buffered at 720 may be output in column order at 730. Outputting the image data in column order may include transmitting or otherwise transferring the image data in column order from one component of the image signal processor to another component of the image signal processor, from the image signal processor to a unit or device external to the image signal processor, or writing or storing the image data in column order to an external data storage unit, such as a shared memory.

Outputting the image data in column order may include, for each pixel from the input image (the current pixel), obtaining, such as by calculating or determining, a respective memory location (the current memory location) in the buffer corresponding to a respective current column order position, obtaining, such as by reading, fetching, or otherwise accessing, the pixel data buffered in the identified current memory location (current pixel data), and outputting the obtained current pixel data.

Buffering the input image data at 720 and outputting the input image data in column order at 730 may be implemented in combination. For example, the input image data may be obtained at 710 by receiving a raster order sequence of pixel values, and outputting the input image data in column order at 730 for a first pixel from the sequence of pixel values, such as the top-left pixel from the input image, may be performed in combination with buffering the input image data at 720 for a second pixel from the sequence of pixel values, such as the bottom-right pixel from the input image.

Although not shown separately in FIG. 7, image signal processing using sequential in-place transposition 700 may include concurrently, or substantially concurrently, buffering the input image data for a first image in raster order at 720 and outputting the input image data from a second, previously buffered, input image in column order at 730.

Figure 8:
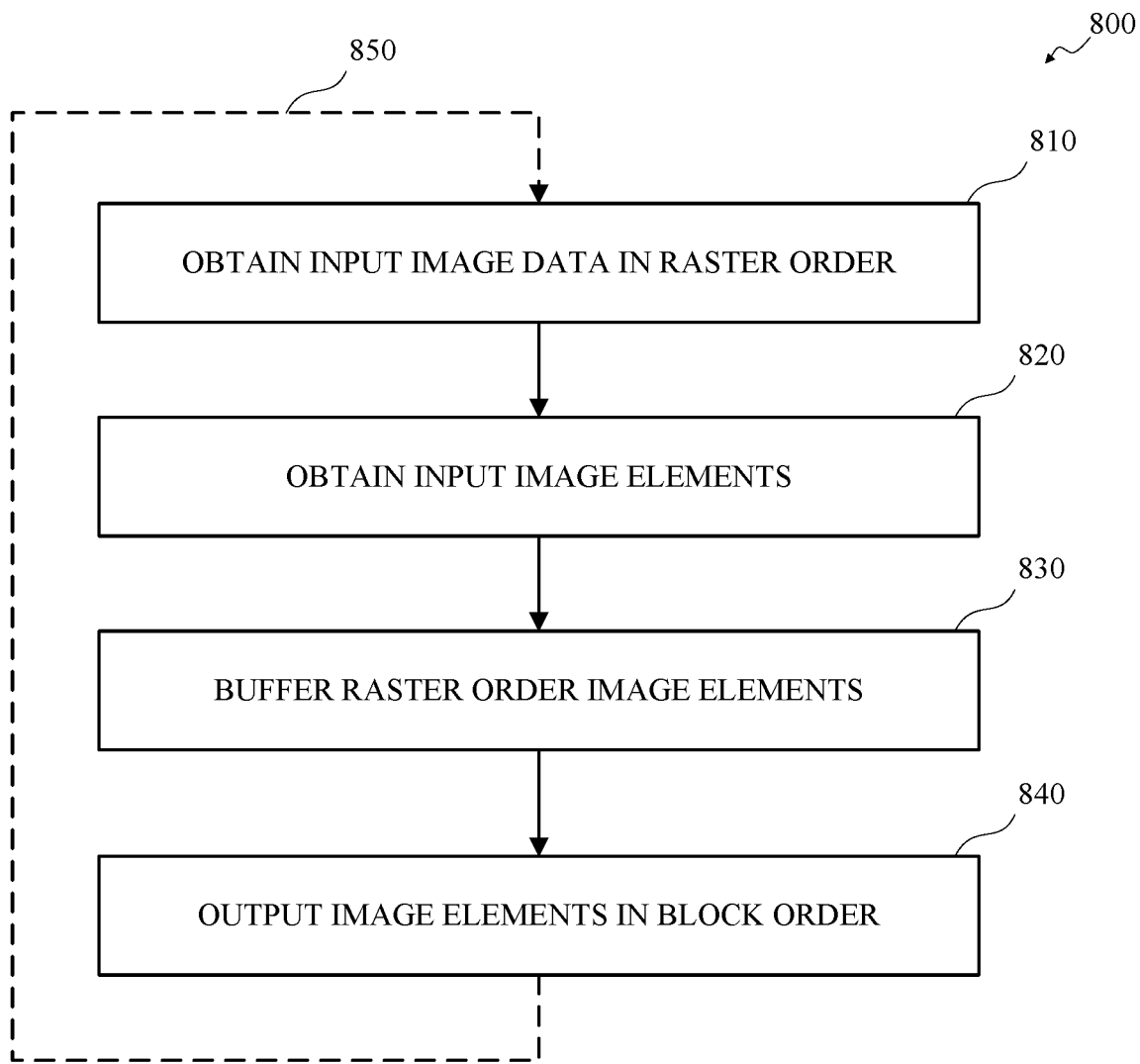
FIG. 8 is a diagram of an example of image signal processing using sequential in-place blocking transposition in accordance with implementations of this disclosure.

FIG. 8 is a diagram of an example of image signal processing using sequential in-place blocking transposition in accordance with implementations of this disclosure. Image signal processing using sequential in-place blocking transposition 800 may be implemented in an image capture apparatus, such as the image capture apparatus 110 shown in FIG. 1 or the image capture apparatus 300 shown in FIG. 3. For example, the image signal processor 500 shown in FIG. 5 may implement image signal processing using sequential in-place blocking transposition 800.

In some implementations, image signal processing using sequential in-place blocking transposition 800 may include obtaining input image data in raster order at 810, chipping the input image data at 820, buffering raster order chips of input image data using a buffer at 830, and outputting block order image data from the buffer at 840.

Input image data may be obtained at 810. An image signal processor, such as the image signal processor 410 shown in FIG. 4 or the image signal processor 500 shown in FIG. 5, which may be included in an image capture apparatus, may receive one or more input image signals, such as the input image signal 430 shown in FIG. 4, from one or more image sensors, such as the image sensor 230 shown in FIG. 2 or the image sensors 340, 342 shown in FIG. 3, or from one or more front image signal processors, such as the front image signal processors 510 shown in FIG. 5, which may include the raster order input image data. Obtaining the input image data for an input image, or frame, at 810 may include receiving, or otherwise accessing, a raster order sequence of pixel values for a defined portion of the input image, such as a defined number, or cardinality, N of rows, which may be a vertical sequence of rows, and which may be referred to herein as a strip of input image data. For example, obtaining a portion of an input image, such as a strip of the input image, at 810 may include obtaining, such as receiving, N rows of raster order image data, such as sixteen (N=16) frame width rows of image data.

An input image may be represented as a two-dimensional matrix, such as the two-dimensional matrix 600 shown in FIG. 6, wherein each location in the two-dimensional matrix corresponds spatially with a respective location in the captured input image and includes a respective value, or values, for a corresponding pixel. The input image may include W columns and H rows, which may be referred to as a W×H image. The set of pixels of a W×H input image may have a cardinality of WH. For example, an input image, or frame, may be a 3840×2160 image, which may include 3840 columns (W=3840), or pixels per row, and 2160 rows (H=2160), and may include 8294400 pixels (WH=8294400). Obtaining raster order image data at 810 may include obtaining a raster order sequence of portions of the input image, such as a strips of the input image, each respective portion including an N cardinality sequential group of rows of input image data.

Figure 9:
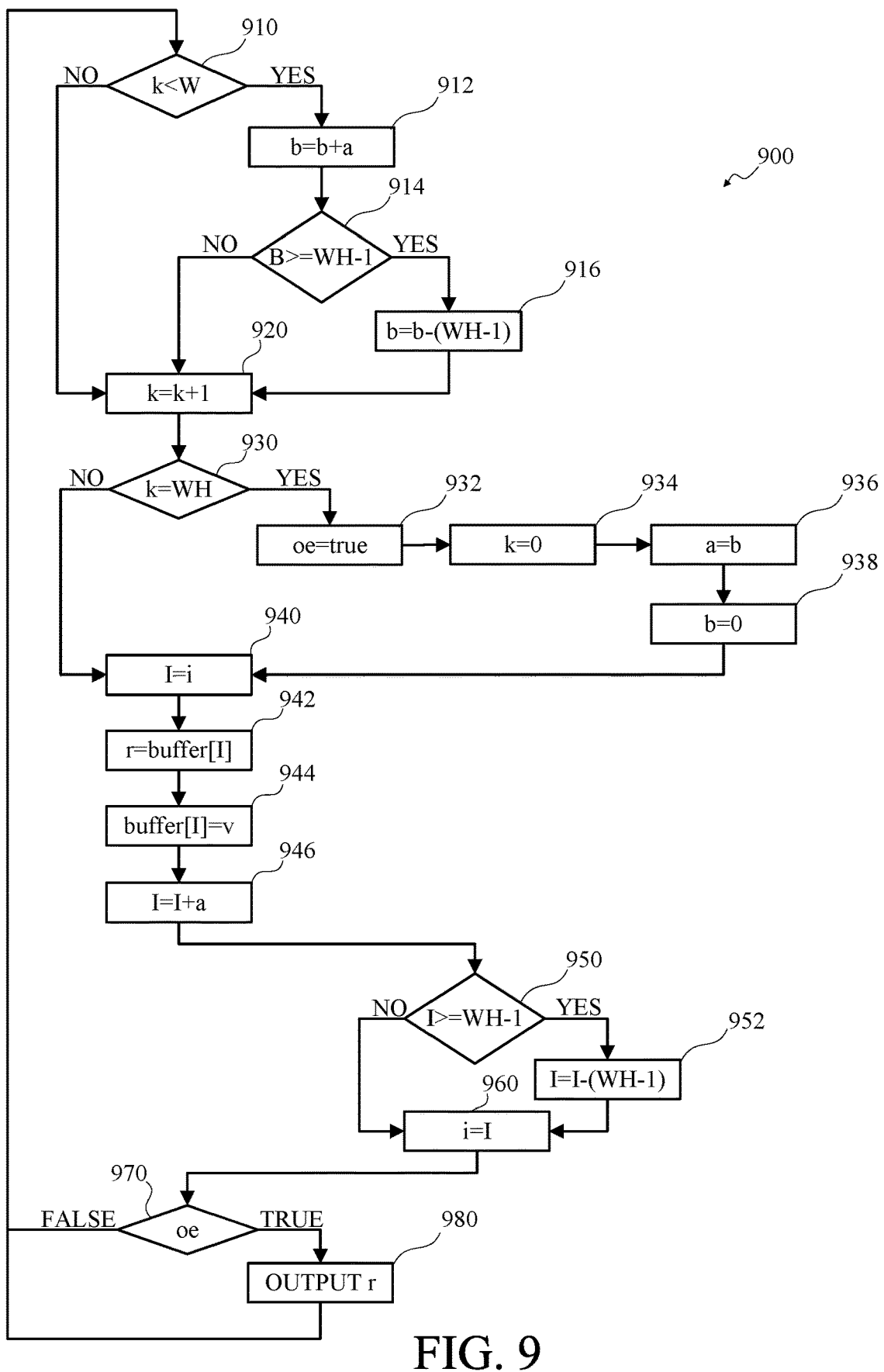
FIG. 9 is a diagram of an example of image signal processing using sequential in-place transposition for a current image element in accordance with implementations of this disclosure.

Although not shown separately in FIG. 9, in some implementations, image signal processing using sequential in-place blocking transposition may include determining whether to perform image signal processing using sequential in-place blocking transposition. For example, image signal processing using sequential in-place blocking transposition may include identifying a subsequent image signal processing operation, wherein outputting the image data in block order at 840 includes outputting the image data to, or for use by, the subsequent image signal processing operation, and includes determining whether to perform image signal processing using sequential in-place blocking transposition based on the relative efficiency of performing the subsequent image signal processing operation using raster order data or block order data, such that the efficiency of image signal processing is maximized. For example, the subsequent image signal processing operation may include performing motion compensation; the efficiency of motion compensation using block order data may exceed the efficiency of motion compensation using raster order data; and image signal processing using sequential in-place blocking transposition may be performed.

A portion, or strip, of raster order input image data, such as a strip including N rows of raster order input image data, may be divided, or otherwise organized, into a raster order sequence of image elements, at 820. Dividing, or otherwise organizing, a portion, or strip, of an input image into a raster order sequence of image elements may be referred to herein as chipping the portion of input image data, and the respective image elements may be referred to herein as chips. Chipping a strip of raster order input image data at 820 may include dividing, or otherwise organizing, the raster order image data into horizontally sequential image elements, groups, or chips of raster order image data, each ship including a defined cardinality of horizontally sequential pixels from the input image. For example, a row of a 3840×2160 input image may be divided into a horizontal sequence of 240 raster order image elements or chips, each chip including 16 raster order pixels from the row.

The raster order chips obtained at 820 may be buffered at 830 using the buffer and, substantially concurrently, previously buffered image data may be output from the buffer in block order at 840. Buffering the input image data may include buffering, writing, caching, or internally storing the input image data, such as the raster order chips of image data, in an internal data storage unit, such as a memory or buffer, by sequentially buffering each raster order image element, such as each raster order chip, of the input image.

The memory available for caching, buffering, or internally storing input image data may be limited or minimized. For example, the W×H input image may include WH pixels, a portion, such as a strip, of the image, which may include N rows, each row in including W pixels, may be obtained at 810, which may include obtaining WN pixels, the input portion obtained at 810 may be divided, or chipped, into W image elements, such as chips, which may each include N horizontally sequential pixels from the input image, and buffering, or internally storing, the portion of the input image may include using a data storage unit, such as a buffer or internal memory, limited to storing fewer than 2W image elements, which may be equivalent to storing fewer than 2WN pixels.

For example, the internal buffer may include W−1 memory locations for concurrently buffering W−1 image elements, each image element including N horizontally sequential pixels. In another example, the internal buffer may include WN−1 pixel memory locations for concurrently buffering WN−1 pixels. Other memory units of a similar magnitude, or larger memory units, may be unavailable. In an example, the input image may be a 3840×2160 image, the input image data may be obtained as sixteen row strips, each strip including 61440 pixels, the strip may be divided into 3840 image elements, each image element including sixteen horizontally sequential pixels, and buffering the input image data may include using a buffer having 3840 memory locations, each memory location configured for storing a respective array of sixteen horizontally sequential pixels, such that each memory location includes sixteen pixel memory locations, and the buffer includes 61424 pixel memory locations (3840*16−16=61424).

For example, an image signal processor, such as the image signal processor 500 shown in FIG. 5, may include a strip size (W−1) buffer for buffering an input image and may omit, or omit using, other similarly sized memory units. Image signal processing using sequential in-place transposition may include using a limited, or minimal, number of other internal memory elements, such as ten or twenty discrete memory locations, such as eight bit memory locations, for storing or maintaining other information related to image signal processing using sequential in-place transposition, such as pointers, counters, or individual pixel values. The combined cardinality of memory locations used for sequential in-place blocking transposition, including discrete memory locations and buffer memory locations, may be significantly less than 2W, such as within W+N.

Buffering the raster order image elements, or chips, of image data at 830 may include buffering a first chip including a top-left pixel of the input image such that the top-left pixel of the input image is buffered in a first pixel memory location, and, subsequently, sequentially buffering each respective chip from the strip in raster order in a respective memory location. The leftmost chip from a current row may be buffered immediately subsequent to buffering the rightmost chip from the row immediately adjacent above the current row. Buffering a chip may include obtaining, such as by determining, calculating, or identifying, a memory location for buffering the respective chip, such as a physical or virtual address of the memory location. For example, the buffer may be implemented as an array and obtaining the memory location for buffering a chip may include obtaining an index or position in the array.

The input image data buffered at 830 may be output from the buffer in block order at 840. Outputting the image data in block order may include transmitting or otherwise transferring the image data in block order from one component of the image signal processor to another component of the image signal processor, from the image signal processor to a unit or device external to the image signal processor, or writing or storing the image data in block order to an external data storage unit, such as a shared memory.

Outputting the image data in block order may include, for each chip from the input image (the current chip or current image element), obtaining, such as by calculating or determining, a respective memory location (the current memory location) in the buffer corresponding to a respective current block order position, obtaining, such as by reading, fetching, or otherwise accessing, the data buffered in the identified current memory location, which may be the value, or values, of a current image element, and outputting the obtained current image element.

Buffering the input image data at 830 and outputting the input image data in block order at 840 may be implemented in combination. For example, the input image data may be obtained at 810 by receiving N rows of a raster order sequence of image elements, and outputting the input image data in block order at 840 for a first image element from the sequence of image elements, such as the top-left chip from the input image, may be performed in combination with buffering the input image data at 830 for a second image element from the sequence of image element, such as the bottom-right chip from the input image.

Although not shown separately in FIG. 8, image signal processing using sequential in-place blocking transposition may include concurrently, or substantially concurrently, buffering a portion of the input image data for a first image in raster order at 830 and outputting a portion of the input image data from a second, previously buffered, input image from the buffer in block order at 840.

Obtaining N rows input image data in raster order at 810, chipping the input image data at 820, buffering raster order chips of input image data at 830, and outputting block order image data in at 840 may be performed sequentially for a raster order sequence of N row strips of input image data, which may include input image data from a sequence of input images, or frames, as indicated by the broken line at 850.

FIG. 9 is a diagram of an example of image signal processing using sequential in-place transposition for a current image element in accordance with implementations of this disclosure. Sequential in-place transposition for a current image element 900 may be implemented in an image capture apparatus, such as the image capture apparatus 110 shown in FIG. 1 or the image capture apparatus 300 shown in FIG. 3. For example, the image signal processor 500 shown in FIG. 5 may implement sequential in-place transposition for a current image element 900.

Sequential in-place transposition for a current image element 900 may implemented in the image signal processing using sequential in-place transposition 700 shown in FIG. 7. For example, each pixel from an input image may be a respective image element, and the buffering shown at 720 in FIG. 7 and the outputting shown at 730 in FIG. 7 may be implemented in combination as the sequential in-place transposition for a current image element 900 shown in FIG. 9. Image signal processing using sequential in-place transposition may include sequential in-place transposition of an input image, which may have a defined width (W), a defined height (H), and a defined image size. The defined width (W) may indicate a cardinality of pixels per row, which may be equivalent to a cardinality of columns in the input image. The defined height (H) may indicate height of the input image in pixels, which may indicate a cardinality of rows, or a cardinality of pixels in each column, of the input image. The defined image size may indicate a cardinality of pixels in the input image and may be obtained as a product of multiplying the defined width by the defined height.

Sequential in-place transposition for a current image element 900 may implemented in the image signal processing using sequential in-place blocking transposition 800 shown in FIG. 8. For example, for each portion, such as each strip, from an input image, a respective image element may be horizontal sequence of pixels having a defined cardinality, such as a chip, and the buffering shown at 830 in FIG. 8 and the outputting shown at 840 in FIG. 8 may be implemented in combination as the sequential in-place transposition for a current image element 900 shown in FIG. 9.

Image signal processing using sequential in-place blocking transposition may include sequential in-place blocking transposition of an input image portion, such as a strip, which may have a defined width (W), a defined height (H), and a defined portion size. The defined width (W) may indicate a cardinality of image elements, such a chips, per row. Each image element may include a horizontal sequence of pixels having a defined cardinality, which may be referred to herein as the defined chip size, and which may be equivalent to the defined height (H). The defined height (H) may indicate a height of the input image portion in pixels, which may indicate a cardinality of rows, or a cardinality of pixels in each column, of the input image portion. The defined portion size may indicate a cardinality of image elements in the input image portion and may be obtained as a product of multiplying the defined width by the defined height (WH). A cardinality of pixels in the input image portion may be obtained as a product of multiplying the defined portion size by the defined chip size.

Sequential in-place transposition for a current image element 900 may include buffering, such as the buffering shown at 720 in FIG. 7 or the buffering shown at 830 in FIG. 8, a current image element of input image data, such as an input pixel or an input chip, and, substantially concurrently, outputting, such as the outputting shown at 730 in FIG. 7 or the outputting 840 shown in FIG. 8, a current output image element, such as a current output pixel or a current output chip.

Image signal processing, such as image signal processing using sequential in-place transposition, such as the image signal processing using sequential in-place transposition 700 shown in FIG. 7, or image signal processing using sequential in-place blocking transposition, such as the image signal processing using sequential in-place blocking transposition 800 shown in FIG. 8, may include obtaining input image data in raster order, which may be equivalent to row-major order.

In response to obtaining each respective image element, such as each respective pixel or each respective chip, from the raster order sequence of image elements, which may be referred to herein as the current input image element (v), sequential in-place transposition for the current image element 900 may include determining whether a value of a raster ordinal identifier (k), which may indicate a current raster order position of the current input image element (v), is less than a defined width, such as the width (W) of the input image, at 910.

The width (W) of the input image may be equal to or greater than the value of the raster ordinal identifier (k), which may be expressed as k<W, and sequential in-place transposition for the current image element 900 may include obtaining a first updated value of a first transposition indicator (b) as the current value of the first transposition indicator (b) at 912, and, subsequently, determining whether the current value of the first transposition indicator (b) is at least, such as greater than or equal to, the size of the buffer, which may be a defined buffer size, which may be one less than the defined image size or the defined portion size (WH−1) at 914.

Obtaining the first updated value of the first transposition indicator (b) as the current value of the first transposition indicator (b) may include obtaining a sum of the current value of the first transposition indicator (b) and a current value of a second transposition indicator (a), which may be expressed as b=b+a or b+=a.

For image signal processing using sequential in-place transposition, such as the sequential in-place transposition shown at 700 in FIG. 7, the defined buffer size may be identified as one less than the cardinality of pixels from the input image and may indicate a cardinality of pixel memory locations in the buffer, wherein each pixel memory location may buffer a value, or values, of a pixel. For example, the input image, or frame, may be a 3840×2160 image, which may include 3840 columns (W=3840), or pixels per row, and 2160 rows (H=2160), and sequential in-place transposition for a current image element 900 may be implemented using a width of 3840 pixels (W=3840), a height of 2160 rows (H=2160), a defined image size of 8294400 (WH=8294400), and a defined buffer size of 8294399 (WH−1=8294399).

For image signal processing using sequential in-place blocking transposition, such as the sequential in-place blocking transposition shown at 800 in FIG. 8, the defined buffer size may be identified as one less than the cardinality of image elements from the defined portion of the input image and may indicate a cardinality of image element memory locations in the buffer, wherein each image element memory location may buffer an image element, which may include buffering a defined, chip size, cardinality of horizontally sequential pixels. For example, the input image, or frame, may be a 3840×2160 image, which may include 3840 columns, or pixels per row, and 2160 rows. Sequential in-place transposition for a current image element 900 may include obtaining an image portion from the input image, which may include a defined cardinality, such as sixteen, of rows of raster order image data. The input image portion may be divided, or chipped, into image elements, or chips, which may each include a defined cardinality, such as sixteen, of horizontally sequential pixels. The width (W) of the image portion may be obtained as the cardinality of chips per row for the input image portion, which may be obtained as a result of dividing the width of the image portion in pixels (3840) by the image element size in pixels (16). For example, the width (W) may be 240 (3840/16=240), and sequential in-place transposition for the current image element 900 may be implemented using a width of 240 (W=240) and a height of sixteen rows (H=16).

The current value of the first transposition indicator (b) may be at least, such as greater than or equal to, the defined buffer size (WH−1), and sequential in-place transposition for a current image element 900 may include obtaining a second updated value of the first transposition indicator (b) as the current value of the first transposition indicator (b) by obtaining a difference between the current value of the first transposition indicator (b) and the defined buffer size at 916, which may be expressed as b=b−(WH−1) or b−=(WH−1).

Sequential in-place transposition for a current image element 900 may include, subsequently, obtaining a first updated value of the raster ordinal identifier (k) as the current value of the raster ordinal identifier (k) by obtaining a sum of the current value of the raster ordinal identifier (k) and one at 920, which may be expressed as k=k+1 or k+=1.

Sequential in-place transposition for a current image element 900 may include, subsequently, determining whether the current value of the raster ordinal identifier (k) is equal to the defined image size or the defined image portion size (WH) at 930.

The current value of the raster ordinal identifier (k) may be equal to the defined image size or the defined image portion size (WH), which may be expressed as k=WH, and sequential in-place transposition for a current image element 900 may include obtaining a current value of an output availability indicator (oe) as true, or an equivalent, such as a binary equivalent, of true, such as 1, at 932, which may be expressed as oe=true, obtaining zero as the current value of the raster ordinal identifier (k) at 934, obtaining the current value of the first transposition indicator (b) as the current value of the second transposition indicator (a) at 936, which may be expressed as a=b, and, subsequently, obtaining zero as the current value of the first transposition indicator (b) at 938.

Sequential in-place transposition for a current image element 900 may include, subsequently, obtaining a current value of a buffer position identifier (i) as a current value of a current buffer location identifier (I) at 940, which may be expressed as I=i.

Sequential in-place transposition for a current image element 900 may include, subsequently, obtaining a current output image element (r) by reading, or fetching, a value of the current output image element (r) from a memory location from the buffer indicated by the current buffer location identifier (I) at 942, which may be expressed as r=buffer[I].

For image signal processing using sequential in-place transposition, such as the image signal processing using sequential in-place transposition shown at 700 in FIG. 7, reading the current output image element (r) may include reading a value, or values, of a corresponding pixel. For image signal processing using sequential in-place blocking transposition, such as the image signal processing using sequential in-place blocking transposition shown at 800 in FIG. 8, reading the current output image element (r) may include reading respective values for each pixel from an image element, such as a chip. For example, the image element may include sixteen horizontally sequential pixels, and reading the current output image element (r) may include reading a memory location including sixteen pixel values or reading sixteen sequential memory locations each including a respective pixel value for the chip.

Sequential in-place transposition for a current image element 900 may include, subsequently, buffering, such as by storing or writing, the current input image element (v) in the buffer at the memory location indicated by the current buffer location identifier (I) at 944, which may be expressed as buffer[I]=v.

For image signal processing using sequential in-place transposition, such as the image signal processing using sequential in-place transposition shown at 700 in FIG. 7, buffering the current input image element (v) may include writing a value, or values, of a corresponding pixel. For image signal processing using sequential in-place blocking transposition, such as the image signal processing using sequential in-place blocking transposition shown at 800 in FIG. 8, buffering the current input image element (v) may include writing respective values for each pixel from an image element, such as a chip. For example, the current input image element (v) may include sixteen horizontally sequential pixels, and buffering the current input image element (v) may include writing sixteen pixel values to a memory location or writing to sixteen sequential memory locations each including a respective pixel value for the chip.

Sequential in-place transposition for a current image element 900 may include, subsequently, obtaining a first updated value of the current buffer location identifier (I) as the current value of the current buffer location identifier (I) by obtaining a sum of the current value of the current buffer location identifier (I) and the current value of the second transposition indicator (a) at 946, which may be expressed as I=I+a or I+=a.

Sequential in-place transposition for a current image element 900 may include, subsequently, determining whether the current value of the current buffer location identifier (I) is at least, such as greater than or equal to, the defined buffer size (WH−1) at 950. The current value of the current buffer location identifier (I) may be at least, such as greater than or equal to, the defined buffer size (WH−1), which may be expressed as I>=WH−1, and, sequential in-place transposition for a current image element 900 may include, subsequently, obtaining a second updated value of the current buffer location identifier (I) as the current value of the current buffer location identifier (I) by obtaining a difference between the current value of the current buffer location identifier (I) and the defined buffer size (WH−1) at 952, which may be expressed as I=I−(WH−1) or I−=(WH−1).

Sequential in-place transposition for a current image element 900 may include, subsequently, obtaining the current value of the current buffer location identifier (I) as the current value of the buffer position identifier (i) at 960, which may be expressed as i=I.

Sequential in-place transposition for a current image element 900 may include, subsequently, determining whether the current value of the output availability indicator (oe) is true at 970. The current value of the output availability indicator (oe) may be true, or an equivalent value, and, sequential in-place transposition for a current image element 900 may include, subsequently, outputting the current output image element (r) at 980.

Although portion sequential in-place transposition for a current image element 900 is described with reference to image signal processing, sequential in-place transposition may be used with other data, such as non-image data.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of human or machine cognizable steps which perform a function. Such program may be rendered in virtually any programming language or environment including, for example, C/C++, C #, Fortran, COBOL, MATLAB™, PASCAL, Python, assembly language, markup languages, such as HTML, Standard Generalized Markup Language (SGML), XML, Voice Markup Language (VoxML), as well as object-oriented environments such as the Common Object Request Broker Architecture (CORBA), Java™ (including J2ME, Java Beans), and/or Binary Runtime Environment, such as Binary Runtime Environment for Wireless (BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays, such as field programmable gate arrays, PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. A non-transitory computer-readable storage medium, comprising executable instructions that, when executed by a processor, facilitate performance of operations, comprising:
    obtaining at least a first portion of a first input image, wherein the first portion of the first input image includes a first set of image elements in raster order and has a defined width, a defined height, and a defined portion size, wherein the defined portion size is a product of multiplying the defined width by the defined height, and wherein the first set of image elements has a cardinality of the defined portion size; and
    sequential in-place blocking transposing the first input image, wherein sequential in-place blocking transposing includes using a buffer, omits using another buffer, and has linear complexity, and wherein sequential in-place blocking transposing the first input image includes:
        buffering the first set of image elements using the buffer, wherein the buffer has a defined buffer size within twice the defined portion size; and
        outputting the first set of image elements from the buffer in block order.

2. The non-transitory computer-readable storage medium of claim 1, wherein sequential in-place blocking transposing omits performing a multiplication operation, omits performing a division operation, and omits performing a modulo operation.

3. The non-transitory computer-readable storage medium of claim 1, wherein the defined buffer size is one less than the defined portion size.

4. The non-transitory computer-readable storage medium of claim 1, wherein:
    the first portion of the first input image includes a vertical sequence of rows, wherein the vertical sequence of rows includes a defined cardinality of rows, and wherein the defined cardinality of rows is the defined height;
    each row from the vertical sequence of rows includes a respective horizontal sequence of image elements from the first set of image elements, wherein each respective horizontal sequence of image elements has a defined cardinality of horizontally sequential image elements, and wherein the defined cardinality of horizontally sequential image elements is the defined width; and
    each image element from the first set of image elements includes a respective horizontal sequence of pixels that has a defined cardinality of horizontally sequential pixels, wherein the defined cardinality of horizontally sequential pixels is the defined height.

5. The non-transitory computer-readable storage medium of claim 1, wherein outputting the first set of image elements from the buffer includes outputting a sequentially first image element from the first set of image elements concurrently with buffering a sequentially last image element from the first set of image elements by:

obtaining, from a first location in the buffer, the sequentially first image element from the first set of image elements; and buffering the sequentially last image element from the first set of image elements in the first location in the buffer.

6. The non-transitory computer-readable storage medium of claim 5, wherein buffering the sequentially last image element from the first set of image elements in the first location in the buffer includes replacing information previously buffered in the first location in the buffer with the sequentially last image element from the first set of image elements.

7. The non-transitory computer-readable storage medium of claim 1, wherein sequential in-place blocking transposing the first input image includes:

obtaining a second portion of the first input image, the second portion of the first input image having the defined width, the defined height, and the defined portion size, the second portion of the first input image including a second set of image elements in raster order, and the second set of image elements having a cardinality of the defined portion size;

buffering the second set of image elements in raster order using the buffer substantially concurrently with outputting the first set of image elements from the buffer in block order; and outputting the second set of image elements from the buffer in block order.

8. The non-transitory computer-readable storage medium of claim 1, wherein the first input image is an input image from a sequence of input images, and wherein the executable instructions, when executed by the processor, facilitate performance of operations, comprising:

sequential in-place blocking transposing a second input image from the sequence of input images, wherein sequential in-place blocking transposing the second input image includes:

obtaining at least a first portion of the second input image, the first portion of the second input image having the defined width, the defined height, and the defined portion size, the first portion of the second input image including a second set of image elements in raster order, and the second set of image elements having a cardinality of the defined portion size;

buffering the second set of image elements in raster order using the buffer substantially concurrently with outputting the first set of image elements in block order, wherein the first set of image elements is a sequentially last set of image elements from the first input image in raster order; and outputting the second set of image elements in block order.

9. The non-transitory computer-readable storage medium of claim 1, wherein sequential in-place blocking transposing the first input image includes:

on a condition that a value of a raster ordinal identifier is less than the defined width:

obtaining a sum of a value of a first transposition indicator and a value of a second transposition indicator as the value of the first transposition indicator; and on a condition that the value of first transposition indicator is at least the defined buffer size, obtaining a difference between the value of the first transposition indicator and the defined buffer size as the value of the first transposition indicator;

obtaining a sum of the value of the raster ordinal identifier and one as the value of the raster ordinal identifier;

on a condition that the value of the raster ordinal identifier is the defined portion size:

obtaining zero as the value of the raster ordinal identifier;

obtaining the value of the first transposition indicator as the value of the second transposition indicator; and obtaining zero as the value of the first transposition indicator;

obtaining a value of a buffer location identifier as a value of a current buffer location identifier;

obtaining a value from a location in the buffer indicated by the value of the current buffer location identifier as a current output element;

buffering a current input element in the location in the buffer indicated by the value of the current buffer location identifier;

obtaining a sum of the value of the current buffer location identifier and the value of the second transposition indicator as the value of the current buffer location identifier;

on a condition that the value of the current buffer location identifier is at least the defined buffer size, obtaining a difference between the value of the current buffer location identifier and the defined buffer size as the value of the current buffer location identifier;

obtaining the value of the current buffer location identifier as the value of the buffer location identifier; and outputting the current output element.

10. A method comprising:

obtaining at least a first portion of a first input image, the first portion of the first input image including a first set of image elements in raster order and having a defined width, a defined height, and a defined portion size, wherein the defined portion size is a product of multiplying the defined width by the defined height, and wherein the first set of image elements has a cardinality of the defined portion size; and sequential in-place blocking transposing a first input image, by a processor in response to instructions stored on a non-transitory computer readable medium, wherein sequential in-place blocking transposing includes using a buffer, omits using another buffer, and has linear complexity, and wherein sequential in-place blocking transposing the first input image includes:

buffering the first set of image elements using the buffer, the buffer having a defined buffer size, wherein the defined buffer size is one less than the defined portion size; and outputting the first set of image elements from the buffer in block order.

11. The method of claim 10, wherein sequential in-place blocking transposing omits performing a multiplication operation, omits performing a division operation, and omits performing a modulo operation.

12. The method of claim 10, wherein:

the first portion of the first input image includes a vertical sequence of rows, wherein the vertical sequence of rows includes a defined cardinality of rows, and wherein the defined cardinality of rows is the defined height;

each row from the vertical sequence of rows includes a respective horizontal sequence of image elements from the first set of image elements, wherein each respective horizontal sequence of image elements has a defined cardinality of horizontally sequential image elements, and wherein the defined cardinality of horizontally sequential image elements is the defined width; and each image element from the first set of image elements includes a respective horizontal sequence of pixels that has a defined cardinality of horizontally sequential pixels, and wherein the defined cardinality of horizontally sequential pixels is the defined height.

13. The method of claim 10, wherein outputting the first set of image elements from the buffer includes outputting a sequentially first image element from the first set of image elements concurrently with buffering a sequentially last image element from the first set of image elements by:

obtaining, from a first location in the buffer, the sequentially first image element from the first set of image elements; and buffering the sequentially last image element from the first set of image elements in the first location in the buffer.

14. The method of claim 10, wherein sequential in-place blocking transposing the first input image includes:

obtaining a second portion of the first input image, the second portion of the first input image having the defined width, the defined height, and the defined portion size, the second portion of the first input image including a second set of image elements in raster order, and the second set of image elements having a cardinality of the defined portion size;

buffering the second set of image elements in raster order using the buffer substantially concurrently with outputting the first set of image elements from the buffer in block order; and outputting the second set of image elements from the buffer in block order.

15. The method of claim 10, wherein the first input image is an input image from a sequence of input images, and wherein sequential in-place blocking transposing the first input image includes:

sequential in-place blocking transposing a second input image from the sequence of input images, wherein sequential in-place blocking transposing the second input image includes:

obtaining at least a first portion of the second input image, the first portion of the second input image having the defined width, the defined height, and the defined portion size, the first portion of the second input image including a second set of image elements in raster order, and the second set of image elements having a cardinality of the defined portion size;

buffering the second set of image elements in raster order using the buffer substantially concurrently with outputting the first set of image elements from the buffer in block order, wherein the first set of image elements is a sequentially last set of image elements from the first input image in raster order; and outputting the second set of image elements from the buffer in block order.

16. The method of claim 10, wherein sequential in-place blocking transposing the first input image includes:

on a condition that a value of a raster ordinal identifier is less than the defined width:

obtaining a sum of a value of a first transposition indicator and a value of a second transposition indicator as the value of the first transposition indicator; and on a condition that the value of the first transposition indicator is at least the defined buffer size, obtaining a difference between the value of the first transposition indicator and the defined buffer size as the value of the first transposition indicator;

obtaining a sum of the value of the raster ordinal identifier and one as the value of the raster ordinal identifier;

on a condition that the value of the raster ordinal identifier is the defined portion size:

obtaining zero as the value of the raster ordinal identifier;

obtaining the value of the first transposition indicator as the value of the second transposition indicator; and obtaining zero as the value of the first transposition indicator;

obtaining a value of a buffer location identifier as a value of a current buffer location identifier;

obtaining a value from a location in the buffer indicated by the value of the current buffer location identifier as a current output element;

buffering a current input element in the location in the buffer indicated by the value of the current buffer location identifier;

obtaining a sum of the value of the current buffer location identifier and the value of the second transposition indicator as the value of the current buffer location identifier;

on a condition that the value of the current buffer location identifier is at least the defined buffer size, obtaining a difference between the value of the current buffer location identifier and the defined buffer size as the value of the current buffer location identifier;

obtaining the value of the current buffer location identifier as the value of the buffer location identifier; and outputting the current output element.

17. An apparatus comprising:

an image signal processor including a buffer having a defined buffer size, the defined buffer size indicating a cardinality of a set of image element buffer locations included in the buffer, each image element buffer location from the set of image element buffer locations configured to buffer a respective image element, the image signal processor configured to:

obtain a first portion of a first input image, the first portion of the first input image including a first set of image elements in raster order and having a defined width, a defined height, and a defined portion size, wherein the defined portion size is a product of multiplying the defined width by the defined height, and wherein the first set of image elements has a cardinality of the defined portion size;

obtain a second portion of the first input image, the second portion of the first input image having the defined width, the defined height, and the defined portion size, the second portion of the first input image including a second set of image elements in raster order, the second set of image elements having a cardinality of the defined portion size, and the first portion of the first input image immediately preceding the second portion of the first input image in raster order; and sequential in-place blocking transpose the first input image using the buffer, such that the image signal processor is configured to:

omit performing a multiplication to sequential in-place blocking transpose the first input image using the buffer;

omit performing a division to sequential in-place blocking transpose the first input image using the buffer;

omit performing a modulo to sequential in-place blocking transpose the first input image using the buffer;

buffer the first set of image elements using the buffer, wherein the defined buffer size is one less than the defined portion size; and substantially concurrently:
- buffer the second set of image elements in raster order using the buffer; and
- output the first set of image elements from the buffer in block order.

18. The apparatus of claim 17, wherein:

the first portion of the first input image includes a vertical sequence of rows, wherein the vertical sequence of rows includes a defined cardinality of rows, and wherein the defined cardinality of rows is the defined height;

each row from the vertical sequence of rows includes a respective horizontal sequence of image elements from the first set of image elements, wherein each respective horizontal sequence of image elements has a defined cardinality of horizontally sequential image elements, and wherein the defined cardinality of horizontally sequential image elements is the defined width; and each image element from the first set of image elements includes a respective horizontal sequence of pixels that has a defined cardinality of horizontally sequential pixels, and wherein the defined cardinality of horizontally sequential pixels is the defined height, such that each image element buffer location from the set of image element buffer locations is configured to buffer a respective horizontal sequence of pixels.

19. The apparatus of claim 17, wherein the image signal processor is configured to:

on a condition that a value of a raster ordinal identifier is less than the defined width:
- obtain a sum of a value of a first transposition indicator and a value of a second transposition indicator as the value of the first transposition indicator; and
- on a condition that the value of first transposition indicator is at least the defined buffer size, obtain a difference between the value of the first transposition indicator and the defined buffer size as the value of the first transposition indicator;

obtain a sum of the value of the raster ordinal identifier and one as the value of the raster ordinal identifier;

on a condition that the value of the raster ordinal identifier is the defined portion size:
- obtain zero as the value of the raster ordinal identifier;
- obtain the value of the first transposition indicator as the value of the second transposition indicator; and
- obtain zero as the value of the first transposition indicator;

obtain a value of a buffer location identifier as a value of a current buffer location identifier;

obtain a value from an image element buffer location from the set of image element buffer locations indicated by the value of the current buffer location identifier as a current output element;

buffer a current input element in the image element buffer location from the set of image element buffer locations indicated by the value of the current buffer location identifier;

obtain a sum of the value of the current buffer location identifier and the value of the second transposition indicator as the value of the current buffer location identifier;

on a condition that the value of the current buffer location identifier is at least the defined buffer size, obtain a difference between the value of the current buffer location identifier and the defined buffer size as the value of the current buffer location identifier;

obtain the value of the current buffer location identifier as the value of the buffer location identifier; and output the current output element.

20. The apparatus of claim 17, wherein the first input image is an input image from a sequence of input images, and wherein the image signal processor is configured to sequential in-place blocking transpose a second input image from the sequence of input images, such that the image signal processor is configured to:

obtain a first portion of the second input image, the first portion of the second input image having the defined width, the defined height, and the defined portion size, the first portion of the second input image including a third set of image elements in raster order, and the third set of image elements having a cardinality of the defined portion size;

buffer the third set of image elements in raster order using the buffer substantially concurrently with outputting the second set of image elements from the buffer in block order, wherein the second set of image elements is a sequentially last set of image elements from the first input image in raster order; and output the third set of image elements from the buffer in block order.

21. The method of claim 1, wherein the defined width is greater than the defined height squared.

* * * * *